(12) United States Patent
Kawamura

(10) Patent No.: US 8,161,006 B2
(45) Date of Patent: Apr. 17, 2012

(54) DATABASE MANAGEMENT METHOD, DATABASE MANAGEMENT APPARATUS, AND DATABASE MANAGEMENT PROGRAM

(75) Inventor: Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 12/370,942

(22) Filed: Feb. 13, 2009

(65) Prior Publication Data

US 2010/0036890 A1 Feb. 11, 2010

(30) Foreign Application Priority Data

Aug. 6, 2008 (JP) ................................. 2008-202920

(51) Int. Cl.
*G06F 7/00* (2006.01)
*G06F 17/00* (2006.01)
(52) U.S. Cl. ....................................................... 707/640
(58) Field of Classification Search .................. 707/640, 707/999.204
See application file for complete search history.

(56) References Cited

U.S. PATENT DOCUMENTS

| | | | | |
|---|---|---|---|---|
| 7,958,091 | B2 * | 6/2011 | Nair et al. ..................... | 707/643 |
| 2004/0103079 | A1 | 5/2004 | Tokusho et al. | |
| 2004/0103257 | A1 * | 5/2004 | Watanabe et al. ............. | 711/162 |
| 2005/0071590 | A1 * | 3/2005 | Watanabe et al. ............. | 711/162 |

FOREIGN PATENT DOCUMENTS

| | | |
|---|---|---|
| JP | 8-006829 | 1/1996 |
| JP | 09-026906 | 1/1997 |
| JP | 2004-178035 | 6/2004 |

OTHER PUBLICATIONS

Office Action in Japanese Patent Application No. 2008-202920 dispatched May 25, 2010.

* cited by examiner

*Primary Examiner* — Kimberly Lovel
(74) *Attorney, Agent, or Firm* — Brundidge & Stanger, P.C.

(57) ABSTRACT

In order to reduce a period of time required for a database operation and maintenance job, provided is a database management method in a database management apparatus that manages a database stored in a storage apparatus including: executing load processing of storing data which is read from the storage apparatus in a memory; executing job processing by reading and writing the data which is stored in the memory; executing unload processing of writing the data which is stored in the memory in the storage apparatus; and executing maintenance processing for the database using the data which is stored in the memory at timing for executing at least one of the load processing and the unload processing.

6 Claims, 16 Drawing Sheets

| 201 | 202 | 203 | 204 | 205 | 206 |
|---|---|---|---|---|---|
| DB AREA NAME | FILE NAME | SIZE | UPDATE PRESENCE OR ABSENCE FLAG | IN-MEMORY BUFFER ADDRESS | CURRENT POINTER |
| DBAREA1 | /DB/DBAREA1 | 300MB | OFF | 0x00000000 | 0x00008A2F |
| DBAREA2 | /DB/DBAREA2 | 200MB | ON | 0x15555555 | 0x1572A0C1 |
| : | : | : | : | : | : |
| DBAREA10 | /DB/DBAREA10 | 600MB | ON | 0xB3333333 | 0xC2340AC6 |

DATABASE MANAGEMENT METHOD, DATABASE MANAGEMENT APPARATUS, AND DATABASE MANAGEMENT PROGRAM

CLAIM OF PRIORITY

The present application claims priority from Japanese patent application JP 2008-202920 filed on Aug. 6, 2008, the content of which is hereby incorporated by reference into this application.

BACKGROUND OF THE INVENTION

This invention relates to a technology of reducing a period of time required for a database operation and maintenance job.

In companies, systems including databases are generally used in order to manage information. In the systems including the databases, maintenance jobs for, for example, acquiring backups of data are periodically performed.

In the systems including the databases, data accumulated and updated by online jobs may be collectively processed and summarized by batch jobs to use summarized information for business judgment.

In a batch job for summarizing accumulated information, it is necessary to access a large volume of data, and hence a load on a system tends to increase during execution of the batch job. In particular, when data is stored on an external storage medium such as a disk drive, a load due to input and output of data increases. Therefore, the batch job is often performed at night when the load is relatively small.

Therefore, in order to reduce the load due to input and output of data, a technology of reducing the number of data inputs and outputs to and from the external storage medium is proposed. For example, JP 08-6829 A discloses a technology of, when a plurality of full search requests for a database are received, reusing data read onto a memory to thereby reduce the number of data inputs and outputs to and from the external storage medium and realize a reduction in response time and improvement of throughput.

In recent years, a large capacity memory can be mounted on a system, and hence an in-memory database that stores data stored on a nonvolatile storage apparatus in the memory and reads and writes the data to thereby realize an increase in speed of processing is now on the market. In particular, when a batch job is performed, it is unnecessary to access an external storage medium during processing, and hence it is possible to obtain a significant effect in a reduction of a load on the system.

SUMMARY OF THE INVENTION

In the in-memory database, when a maintenance job for the database is performed, for example, when backup of data is acquired, an online job is stopped in order to prevent the data from being updated during the backup. As a procedure for acquiring the backup, first, the online job is stopped and the data stored in the memory is stored to the external storage medium. Thereafter, the data stored on the external storage medium is read and the read data is written on a storage medium which stores the backup.

Therefore, the data is written on the external storage medium when the online job ends. The data is read from the external storage medium when the backup is acquired. In order to perform in-memory data processing to perform the batch job, in storing the data in-memory, it is necessary to read the data from the external storage medium and store the data in the memory.

In a case where the data stored on the external storage medium is frequently read and written as described above, a load on the system increases. If a capacity of the database is large, the load further increases because of the acquisition of the backup and the in-memory storage of the data. As a result, a period of time required for the maintenance job for the database and the batch job, i.e., stop time of the online job increases.

This invention provides a technology of reducing frequency of access to the external storage medium to thereby reduce the period of time required for the maintenance job such as backup and reduce the stop time of the online job.

The representative aspects of this invention are as follows. That is, there is provided a database management method in a database management apparatus that manages a database stored in a storage apparatus, the database management apparatus comprising: an interface coupled to the storage apparatus; a processor coupled to the interface; and a memory coupled to the processor, the database management method including the steps of: executing load processing of storing data which is read from the storage apparatus in the memory; executing job processing by reading and writing the data which is stored in the memory; executing unload processing of writing the data which is stored in the memory in the storage apparatus; and executing maintenance processing for the database using the data which is stored in the memory at timing for executing at least one of the load processing and the unload processing.

According to a representative aspect of this invention, it is possible to reduce period of time for reading the data from the external storage medium by executing the maintenance processing for the database such as the backup using the data stored in the memory.

BRIEF DESCRIPTION OF THE DRAWINGS

The present invention can be appreciated by the description which follows in conjunction with the following figures, wherein:

FIG. 2 is a diagram of an example of an in-memory management table according to the embodiment of this invention;

DETAILED DESCRIPTION OF THE PREFERRED EMBODIMENT

An embodiment of this invention will be described below with reference to the accompanying drawings.

Figure 1:
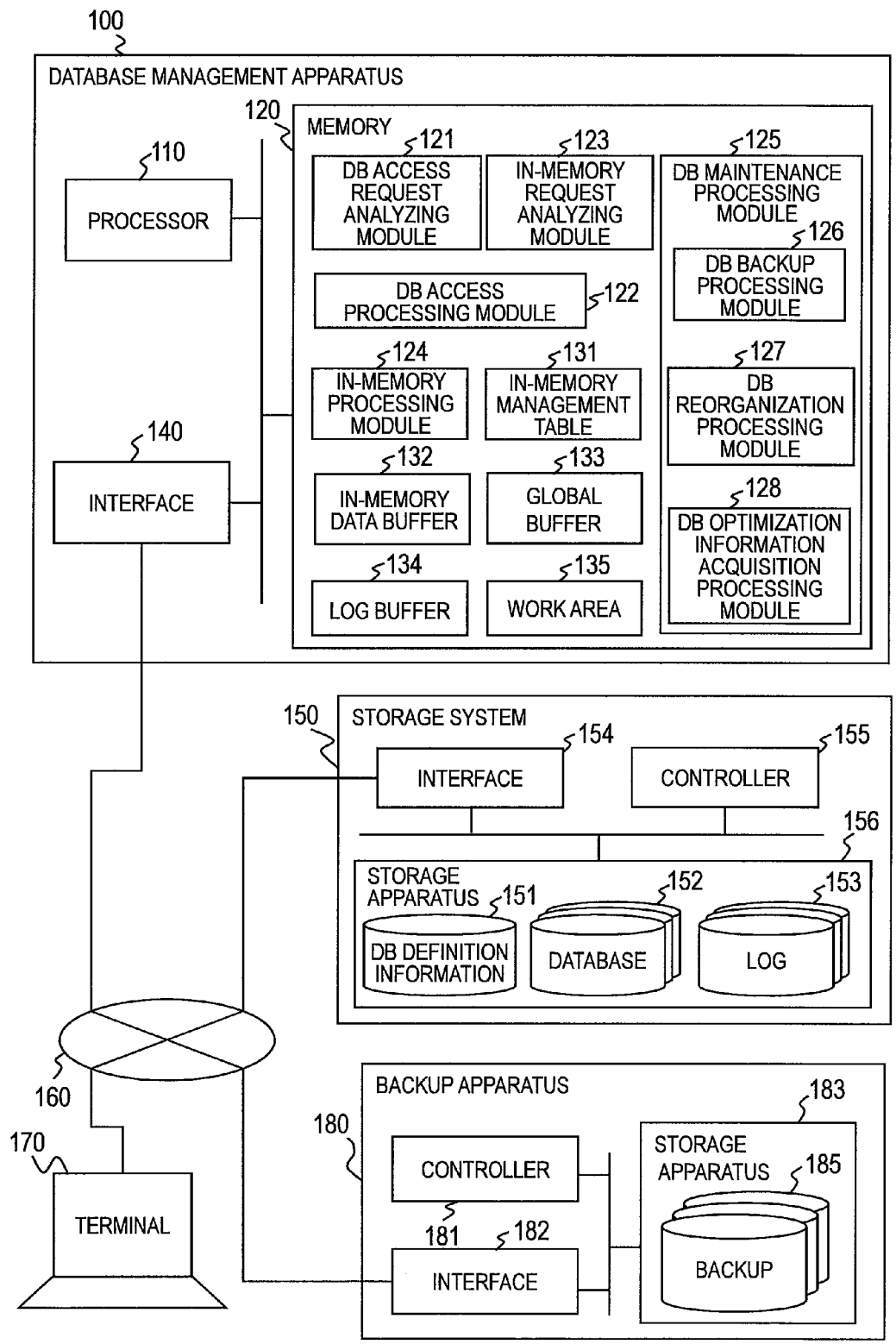
FIG. 1 is a diagram of a configuration of a computer system according to a embodiment of this invention.

FIG. 1 is a diagram of a configuration of a computer system according to the embodiment of this invention.

The computer system according to the embodiment of this invention includes a database management apparatus 100, a storage system 150, a terminal 170, and a backup apparatus 180. The database management apparatus 100, the storage system 150, the terminal 170, and the backup apparatus 180 are coupled to one another via a network.

The database management apparatus 100 manages data stored in the storage system 150. The database management apparatus 100 receives a data access request from the terminal 170 and controls read and write of data to be managed. Backup data of the data managed by the database management apparatus 100 is stored in the backup apparatus 180.

Further, the database management apparatus 100 can perform in-memory data processing. The in-memory data processing is processing of storing data to be managed, which is stored on the storage system 150, in a memory 120, and performing control so as to access the data stored in the memory 120 when a data access request is received. This eliminates the need to access the storage system 150, and hence it is possible to improve response performance of data access.

The storage system 150 stores the data managed by the database management apparatus 100 as described above. Instead of storing the data in the storage system 150, a storage apparatus such as a disk drive may be mounted on the database management apparatus 100 to store the data in the storage apparatus. The database management apparatus 100 and the storage system 150 may be coupled by an Ethernet or the like or may be coupled by a storage area network (SAN) or the like.

The terminal 170 receives an input from a user and transmits a data access request or the like to the database management apparatus 100.

The backup apparatus 180 stores backup of the data managed by the database management apparatus 100 as described above. The backup apparatus 180 is, for example, a storage system but may be an external storage medium directly coupled to the database management apparatus 100 or may be a tape device or the like.

A configuration of the database management apparatus 100 will be described. The database management apparatus 100 includes a processor 110, a memory 120, and an interface 140.

The processor 110 performs various kinds of job processing by processing computer programs stored in the memory 120. The memory 120 stores the computer programs processed by the processor 110 and data used by the computer programs. The computer programs and the data stored in the memory 120 will be described later.

The interface 140 is coupled to the terminal 170 and the backup apparatus 180 via a network 160.

The computer programs and the data stored in the memory 120 will be described. A DB access request analyzing module 121, a DB access processing module 122, an in-memory request analyzing module 123, an in-memory processing module 124, and a DB maintenance processing module 125 are stored in the memory 120 as the computer programs. An in-memory management table 131 is also stored in the memory 120. An in-memory data buffer 132, a global buffer 133, a log buffer 134, and a work area 135 are allocated to the memory 120 as storage areas for storing data stored in a database or for temporarily storing data.

The DB access request analyzing module 121 receives a data access request transmitted by the terminal 170 or the like and analyzes requested contents. The DB access processing module 122 reads and writes the data stored in a database 152 based on an analysis result of the data access request transmitted by the terminal 170.

The in-memory request analyzing module 123 receives and analyzes a command for execution or cancellation of the in-memory data processing. The in-memory processing module 124 controls the in-memory data processing based on an analysis result of the command received by the in-memory request analyzing module 123.

The DB maintenance processing module 125 is a program group for executing processing necessary for operations such as backup. The DB maintenance processing module 125 includes a DB backup processing module 126, a DB reorganization processing module 127, and a DB optimization information acquisition processing module 128.

The DB backup processing module 126 backs up DB definition information 151, the database 152, and a log 153 stored in the storage system 150. In the embodiment of this invention, backup data is stored in backup 185 stored in the backup apparatus 180.

The DB reorganization processing module 127 reorganizes physical storage order of data stored in the database. In the database, when deletion and addition of data are repeatedly performed, physical areas in which records are stored are fragmented. The reorganization of the database means elimination of the fragmentation by aligning physical storage order and logical storage order of the records to store the data in the DB areas again.

The DB optimization information acquisition processing module 128 acquires optimization information including statistics information of objects included the database in order to optimize performance of the database. The optimization of the performance of the database is, for example, an increase in speed of data search processing. A table for storing data, index information for increasing speed of search, and the like are included in the objects included the database. In a case where the object is a table, the statistics information of the objects includes, for example, the number of records and a data volume. Therefore, the optimization information changes according to update and the like of the data, and hence, in order to maintain the performance of the database, it is necessary to periodically acquire the optimization information and tune the database.

The in-memory management table 131 is a table for managing the in-memory data buffer 132. Details of the in-memory management table 131 will be described later with reference to FIG. 2.

The in-memory data buffer 132 is an area in which the data stored in the database 152 is stored in DB area units (e.g., file). The data stored in the database 152 is stored in the global buffer 133 in page units. Input and output of data between the memory 120 and the storage system 150 are managed in page units.

The log buffer 134 is an area in which log information is temporarily stored in a case where data is updated. The work area 135 is an area for temporarily storing the data. For example, the work area 135 is used in a case where the data is sorted. Variables such as a pointer temporarily used during processing are stored in the work area 135.

The storage system 150 includes an interface 154, a controller 155, and a storage apparatus 156.

The controller 155 controls input and output of data based on a request from the database management apparatus 100. The interface 154 is coupled to the database management apparatus 100 via a network.

The storage apparatus 156 stores the database (DB) definition information 151, the database 152, and the log 153.

Schema information of the managed database and the like are stored in the DB definition information 151. For example, when data is stored in a table format, definition information such as a name of a field in which a table is stored and a data type is stored in the DB definition information 151.

Management target data itself is stored in the database 152. An update history of the data stored in the database 152 is stored in the log 153. The data can be recovered according to log information stored in the log 153, for example, when failure occurs.

The backup apparatus 180 includes a controller 181, an interface 182, and a storage apparatus 183.

The controller 181 controls input and output of data based on a request from the database management apparatus 100. The interface 182 is coupled to the database management apparatus 100 via a network. The storage apparatus 183 stores backup data of the data managed by the database management apparatus 100.

FIG. 2 is a diagram of an example of the in-memory management table 131 according to the embodiment of this invention.

The in-memory management table 131 manages the in-memory data buffer 132 as described above. Specifically, the in-memory management table 131 manages correspondence between an area (file) in which data is physically stored in the storage system 150 and an area stored in the in-memory data buffer 132.

The in-memory management table 131 includes a database (DB) area name 201, a file name 202, a size 203, an update presence or absence flag 204, an in-memory buffer address 205, and a current pointer 206.

The DB area name 201 is a name for identifying an area (DB area) in which data is stored. The DB area is provided by one or more files. Data is stored in the DB area in page units. The file name 202 is a name of a file that provides the DB area. The size 203 is a size (capacity) of the DB area.

The update presence or absence flag 204 is a flag that indicates whether stored data is updated in a case where the DB area is present in the in-memory data buffer 132. "ON" is set in the flag when the data stored in the DB area is updated. "OFF" is set in the flag when the data is not updated. When the update is reflected on the database 152, the update present or absence flag 204 is set to "ON".

The in-memory buffer address 205 is an address on the in-memory data buffer 132 to which the DB area is allocated. The current pointer 206 is an address of an area currently being read when data is sequentially read.

The in-memory management table 131 may be created at timing when the database is started or may be created when in-memory data processing is performed.

Maintenance procedures by the database management apparatus 100 will be described with reference to FIGS. 3 to 7. In the maintenance procedure described here, first, the database management apparatus 100 stops an online job and performs a batch job 1 or a batch job 2. After finishing the batch job, the database management apparatus 100 resumes the online job. In the embodiment of this invention, a period of time required for a maintenance job is reduced by performing a maintenance job at the start or the end of the batch job.

In the batch job, the database management apparatus 100 reads to the in-memory data buffer 132 all data pieces stored in the database 152 and performs processing. On the other hand, in the online job, the database management apparatus 100 reads the data stored in the database 152 to the global buffer page by page and performs processing.

In a case where processing of reading and writing a large volume of data like the batch job is performed, performance is deteriorated because of input and output of data to and from the storage system 150. The input and output of the data to and from the storage system 150 can be minimized by loading all the data pieces into the memory.

Usually, in a case where data is backed up, data stored in the database 152 is read and the read data is written in a backup destination. Processing of reading the data stored in the database 152 gives a large load to the system because a large volume of data is input to and output from the storage system 150.

In the embodiment of this invention, an increase in load due to the input and output of data to and from the storage system 150 is suppressed by carrying out maintenance processing such as backup of the database at timing when data is read to the in-memory data buffer 132 during execution of the in-memory data processing.

Figure 3:
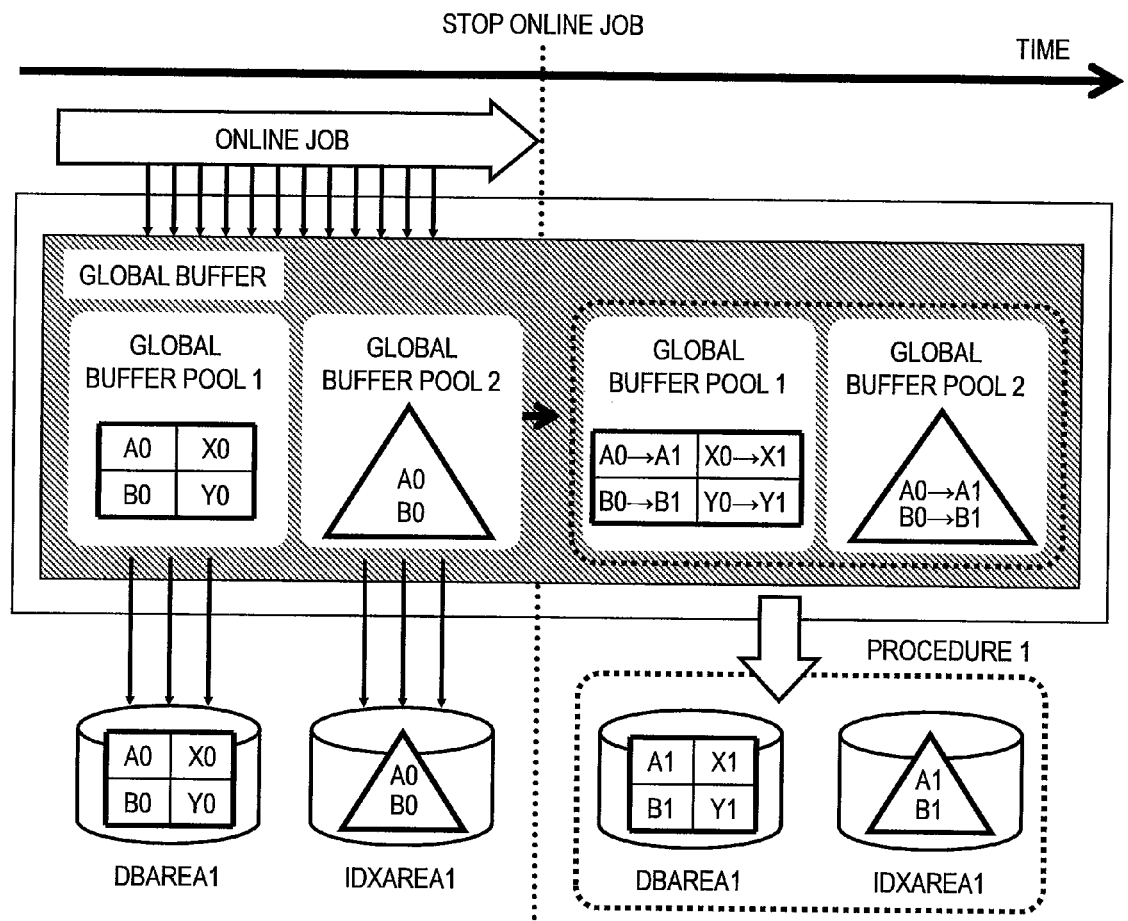
FIG. 3 is a diagram of a maintenance procedure by a database management apparatus according to the embodiment of this invention.

FIG. 3 is a diagram of a maintenance procedure by the database management apparatus 100 according to the embodiment of this invention. In FIG. 3, processing of stopping an online job and synchronizing data stored in the global buffer and data stored in the database 152 will be described.

In the online job, data is read from the database 152 and stored in the global buffer. Referring to FIG. 3, as an example, a table 301 is read from a DB area "DBAREA1" to a global buffer pool 1. An index 302 of the table 301 is read to a global buffer pool 2 (on the left side of FIG. 3). Thereafter, when the online job is stopped, contents of the table 301 and the index 302 are updated by the online job.

After the online job is stopped, the processor 110 of the database management apparatus 100 synchronizes the data stored in the global buffer and the data stored in the database 152 (procedure 1, on the right side of FIG. 3).

Figure 4:
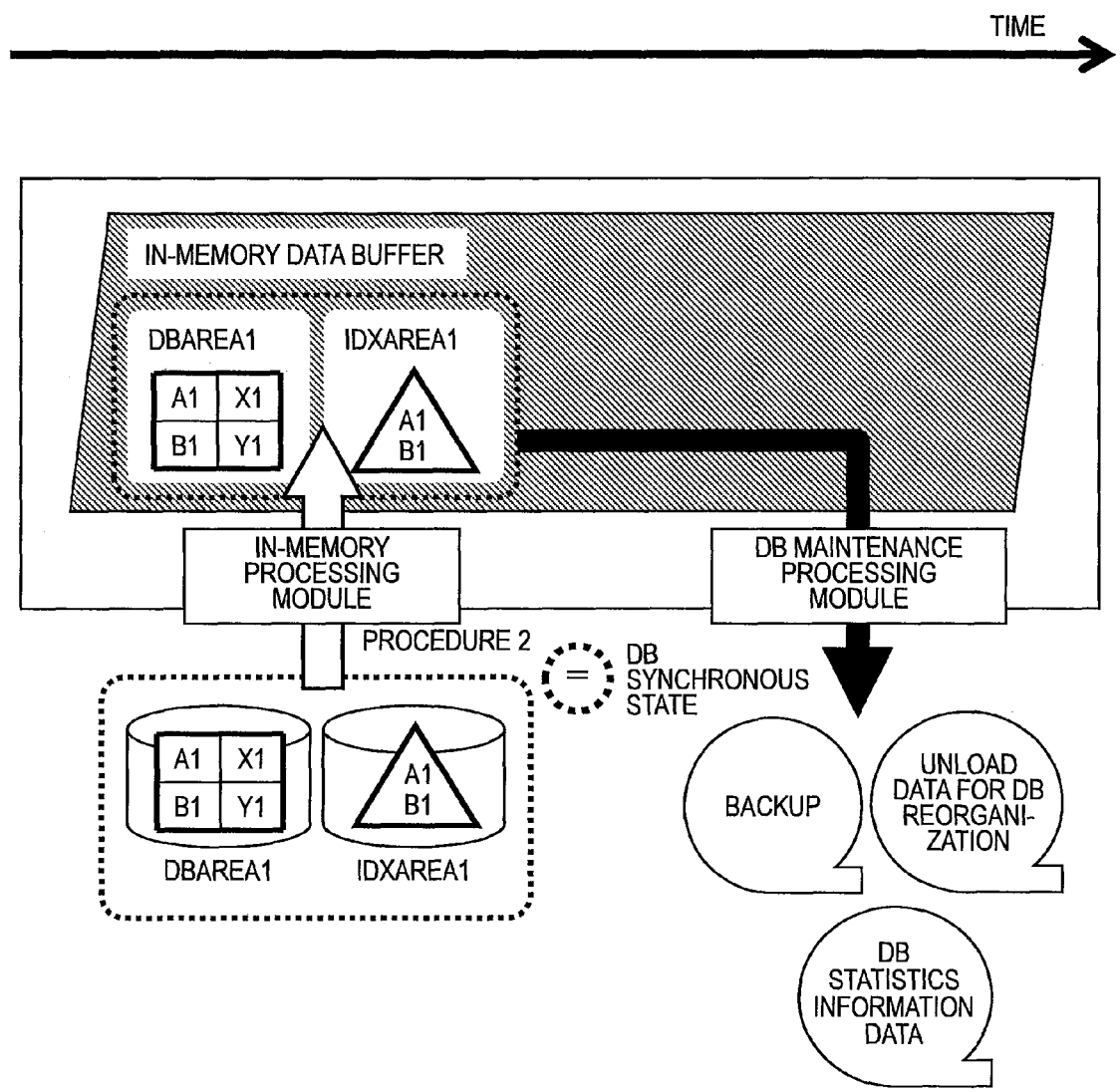
FIG. 4 is a diagram of the maintenance procedure by the database management apparatus according to the embodiment of this invention.

FIG. 4 is a diagram of a maintenance procedure by the database management apparatus 100 according to the embodiment of this invention. In FIG. 4, processing of acquiring backup after the online job is stopped and before the batch job is started will be described.

The batch job is performed in the in-memory data processing as described above. Therefore, before the batch job is started, first, the in-memory processing module 124 is performed by the processor 110 of the database management apparatus 100 and the data stored in the database 152 is read to the in-memory data buffer 132 (procedure 2).

The in-memory data buffer 132 and the database 152 are in a synchronous state at a time point when the data is read to the in-memory data buffer 132. Therefore, it is possible to perform, without separately reading data from the storage system 150, the maintenance job by executing the maintenance job using the data read to the in-memory data buffer 132.

In a case where the maintenance job is performed before the batch job is started, it is possible to reduce stop time of the online job by executing the batch job and the maintenance job in parallel to each other.

Figure 5:
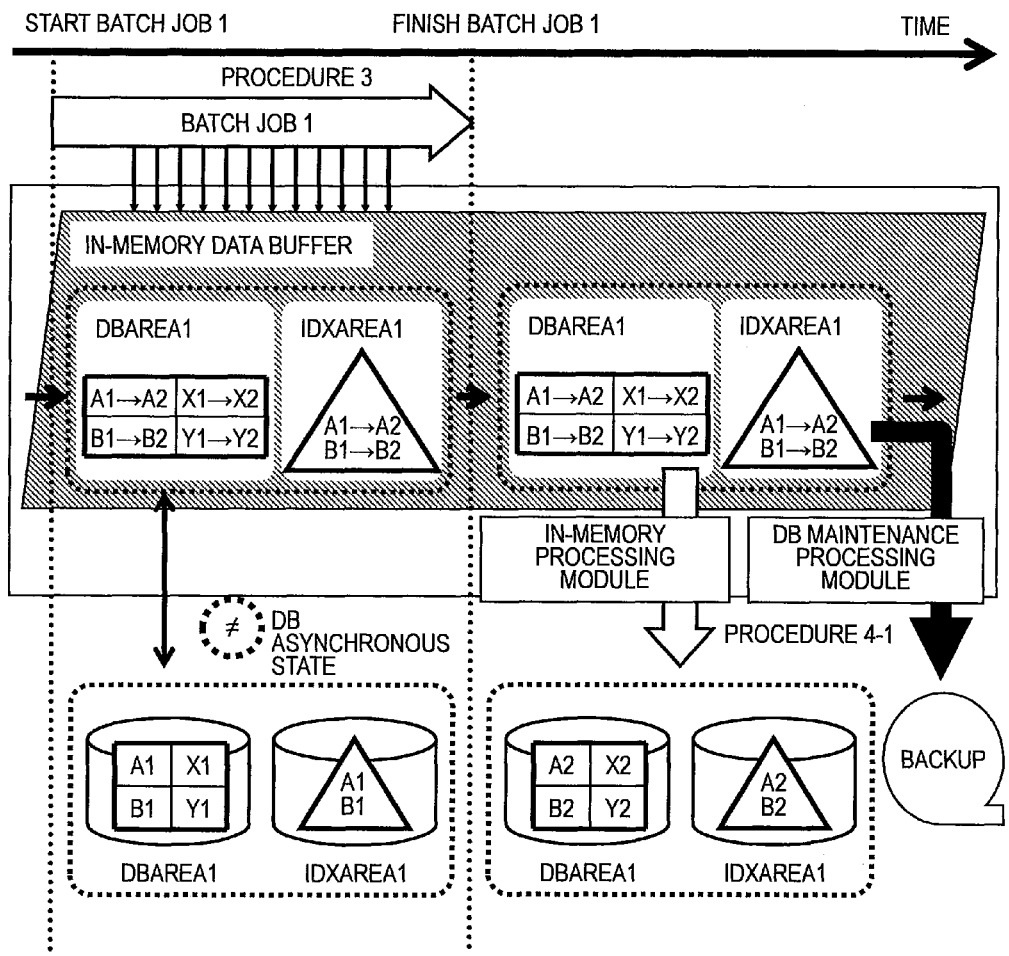
FIG. 5 is a diagram of the maintenance procedure by the database management apparatus according to the embodiment of this invention.

FIG. 5 is a diagram of a maintenance procedure by the database management apparatus 100 according to the embodiment of this invention. In FIG. 5, a procedure of synchronizing the data stored in the in-memory data buffer 132 updated by the batch job 1 and the data stored in the database 152, and executing the maintenance job will be described.

In a case where the data stored in the database 152 is read to the in-memory data buffer 132, the processor 110 of the database management apparatus 100 starts the batch job 1 (procedure 3, on the left side of FIG. 5). In a case where update processing is included in the batch job 1, the data stored in the in-memory data buffer 132 and the data stored in the database 152 are in an asynchronous state in which the data pieces do not coincide with each other.

At a time point when the batch job 1 ends, the in-memory data buffer 132 and the database 152 are in the asynchronous state, and hence the processor 110 of the database management apparatus 100 synchronizes the in-memory data buffer 132 and the database 152 (procedure 4-1, on the right side of FIG. 5). The maintenance job such as backup can be performed in parallel using the updated data stored in the in-memory data buffer 132.

In a case where another batch job is continuously carried out after the batch job 1 is finished, the database management apparatus 100 may continuously carry out the batch job without synchronizing the in-memory data buffer 132 and the database 152. In this case, data input and output to and from the storage system 150 can be reduced, and hence a period of time required for the batch job can be reduced. However, when processing in the subsequent batch job ends in failure, it is necessary to store the data stored in the database 152 or latest backup data in-memory and perform the batch job again.

Figure 6:
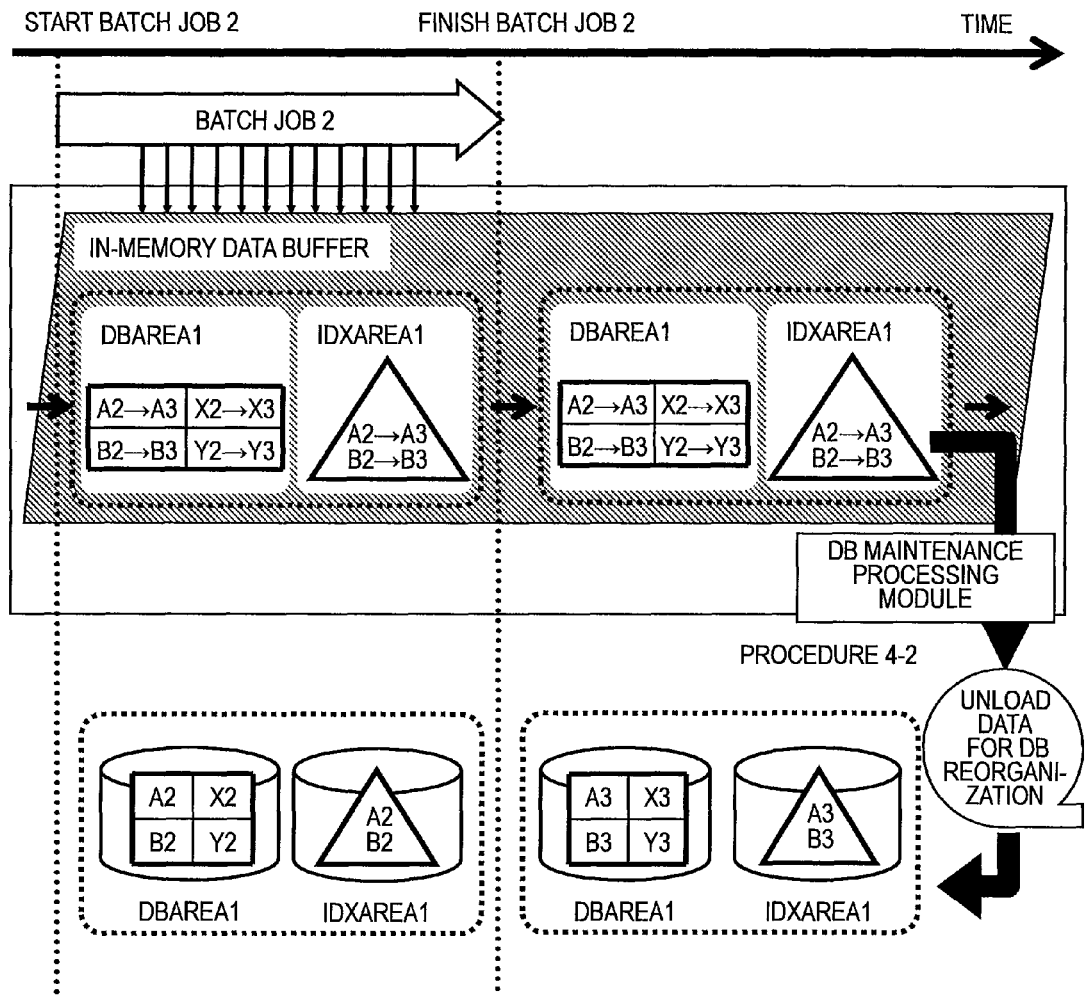
FIG. 6 is a diagram of the maintenance procedure by the database management apparatus according to the embodiment of this invention.

FIG. 6 is a diagram of a maintenance procedure by the database management apparatus 100 according to the embodiment of this invention. In FIG. 6, a procedure of reorganizing the database 152 using data stored in the in-memory data buffer 132 from the start to the end of the batch job 2 will be described.

After the batch job 1 ends, in a case where the synchronization of the in-memory data buffer 132 and the database 152 is completed, the processor 110 of the database management apparatus 100 starts the batch job 2 (on the left side of FIG. 6).

In a case where the batch job 2 is completed, the processor 110 of the database management apparatus 100 synchronizes the data stored in the in-memory data buffer 132 on the database 152. In the case illustrated in FIG. 6, rather than directly synchronizing the data stored in the in-memory data buffer 132 on the database 152, the processor 110 of the database management apparatus 100 performs database reorganization as one of maintenance jobs (procedure 4-2, on the right side of FIG. 6). The reorganization of the database means, as described above, storing of the data again so that fragmentation of the DB area is eliminated. Specifically, the processor 110 of the database management apparatus 100 stores the data stored in the in-memory data buffer 132 in the buffer (work area 135) in units of records and, when a volume of stored data reaches a volume for one page, the database management apparatus 100 writes the data in the database 152.

Further, at this time point, the database management apparatus 100 may acquire, using the data stored in the in-memory data buffer 132, backup or optimization information including statistics information of the objects included the database.

Figure 7:
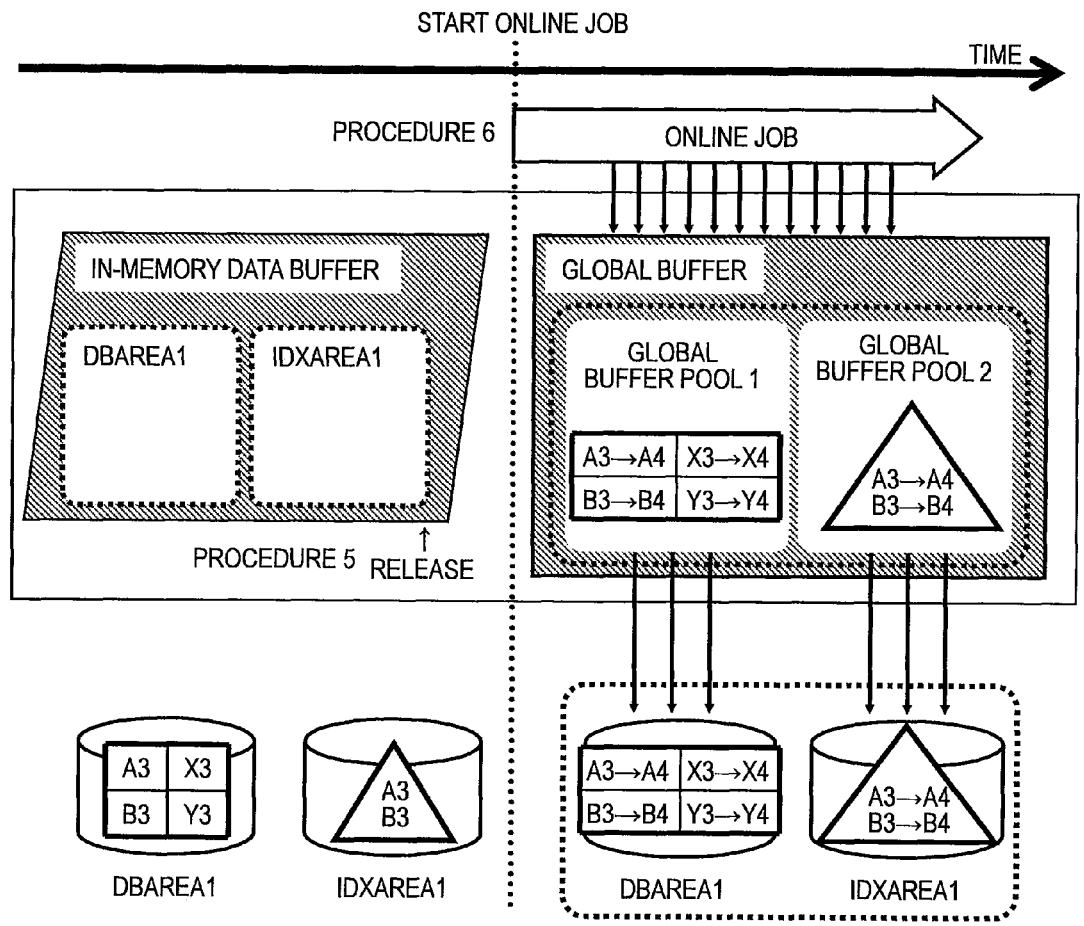
FIG. 7 is a diagram of the maintenance procedure by the database management apparatus according to the embodiment of this invention.

FIG. 7 is a diagram of a maintenance procedure by the database management apparatus 100 according to the embodiment of this invention. In FIG. 7, a procedure of resuming the online job after the batch job 2 ends will be described.

In the embodiment of this invention, in a case where all of a series of batch jobs end and the online job is resumed, first, the processor 110 of the database management apparatus 100 deletes the in-memory data buffer 132 from the memory 120 (procedure 5). Thereafter, the processor 110 of the database management apparatus 100 resumes the online job using the global buffer 133 (procedure 6).

As described above, after the online job is stopped, database maintenance processing is performed as the maintenance job at timing before or after execution of the batch job. Therefore, it is possible to designate a command performed by the batch job to perform, as an option, the database maintenance processing before or after execution of the batch job.

In a case where the database maintenance processing is acquisition of backup and update processing is included in the batch job, even if the backup is acquired before execution of the batch job, the backup is updated immediately after the acquisition. In this case, latest backup can be acquired if the backup is acquired after execution of the batch job. On the other hand, if the update processing is not included in the batch job, the backup can be acquired in parallel to the batch job. Therefore, it is possible to reduce a total processing time of the batch job and the database maintenance processing. In a case where the update processing is included in the batch job, the database management apparatus 100 may acquire the backup before and after execution of the batch job in preparation for failure in the batch job.

Further, the database management apparatus 100 may analyze contents of the batch job, determine whether the update processing is included in the batch job, and automatically determine, based on a result of the determination, timing for executing backup.

An overview of processing of executing the database maintenance processing such as backup during memory load and memory unload will be described. An overview of processing of executing the backup processing during memory load and memory unload will be described with reference to FIGS. 8 and 9. An overview of the processing of reorganizing a database during memory unload will be described with reference to FIG. 10.

Figure 8:
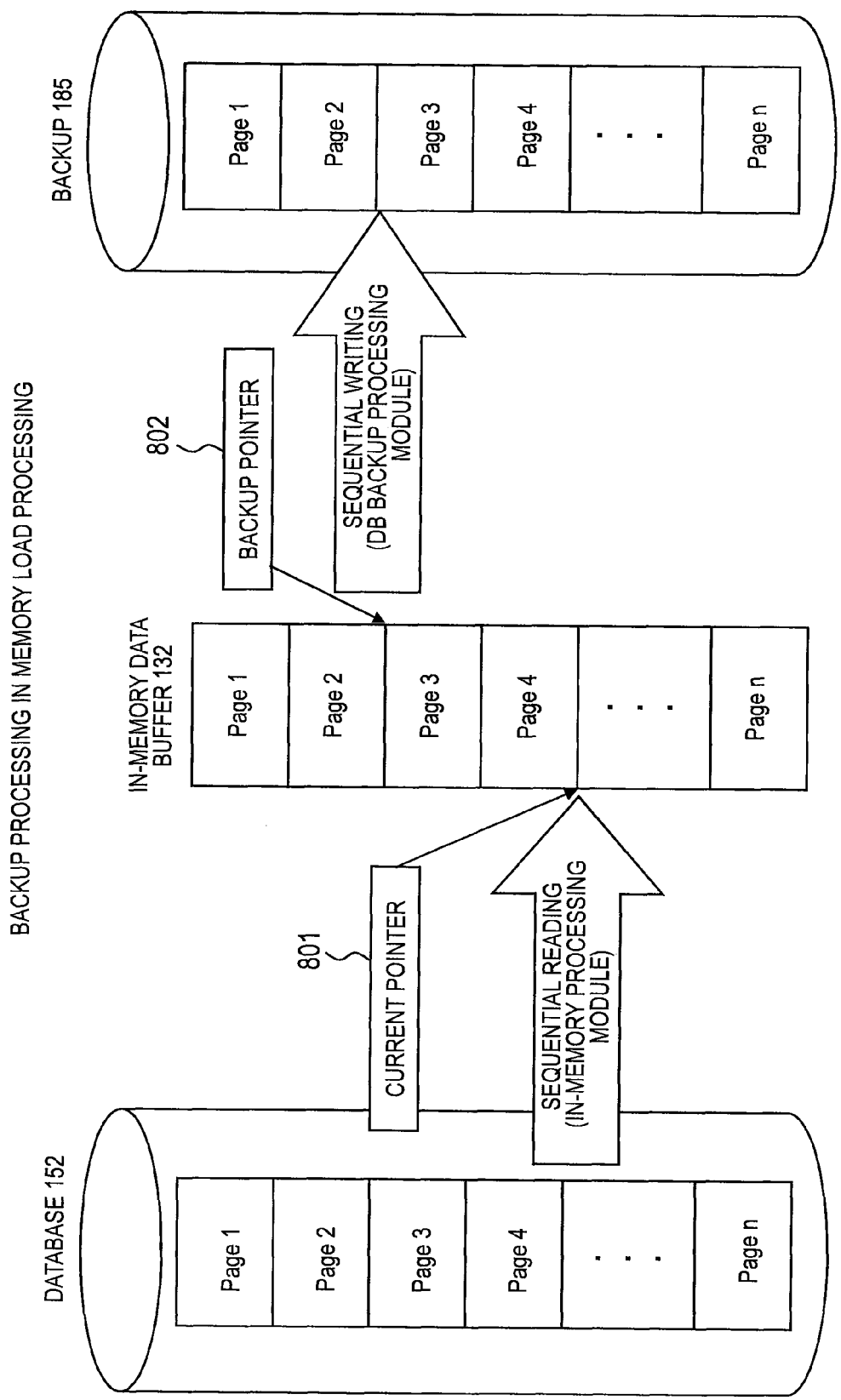
FIG. 8 is a diagram illustrating an overview of backup processing in memory load processing according to the embodiment of this invention.

FIG. 8 is a diagram illustrating an overview of backup processing in memory load processing according to the embodiment of this invention.

The memory load processing is processing of loading data from the database 152 to the in-memory data buffer 132 before the batch job is started.

As described above, the database maintenance processing in the memory load processing is particularly effective in a case where the update processing is not included in the batch job to be performed. Backup can be acquired in parallel to the batch job, and hence it is possible to reduce the total processing time of the batch job and the database maintenance processing.

In the processing illustrated in FIG. 8, after data is loaded from the database 152 to the in-memory data buffer 132, the processor 1 10 of the database management apparatus 100 acquires backup by writing the loaded data in the backup 185 page by page.

In the database 152, areas are divided for each of the pages and data is stored in the areas. The processor 1 10 of the database management apparatus 100 sequentially loads the data stored in the database 152 to the in-memory data buffer 132 in order from a start address by executing the in-memory processing module 124. A current pointer 801 is an address of a page loaded to the in-memory data buffer 132.

The processor 1 10 of the database management apparatus 100 sequentially writes the data loaded to the in-memory data buffer 132 in the backup 185 page by page by executing the DB backup processing module 126 of the DB maintenance processing module 125. A backup pointer 802 is an address of a page whose data is written in the backup 185 from the in-memory data buffer 132.

The current pointer 801 and the backup pointer 802 indicate addresses in the in-memory data buffer 132. Values of the current pointer 801 and the backup pointer 802 are updated according to the progress of readout of the data from the database 152 and writing of the data in the backup 185. The backup pointer 802 does not overtake the current pointer 801. When the backup pointer 802 catches up with the current pointer 801, the backup pointer 802 stays on standby until the data is loaded to the in-memory data buffer 132.

Figure 9:
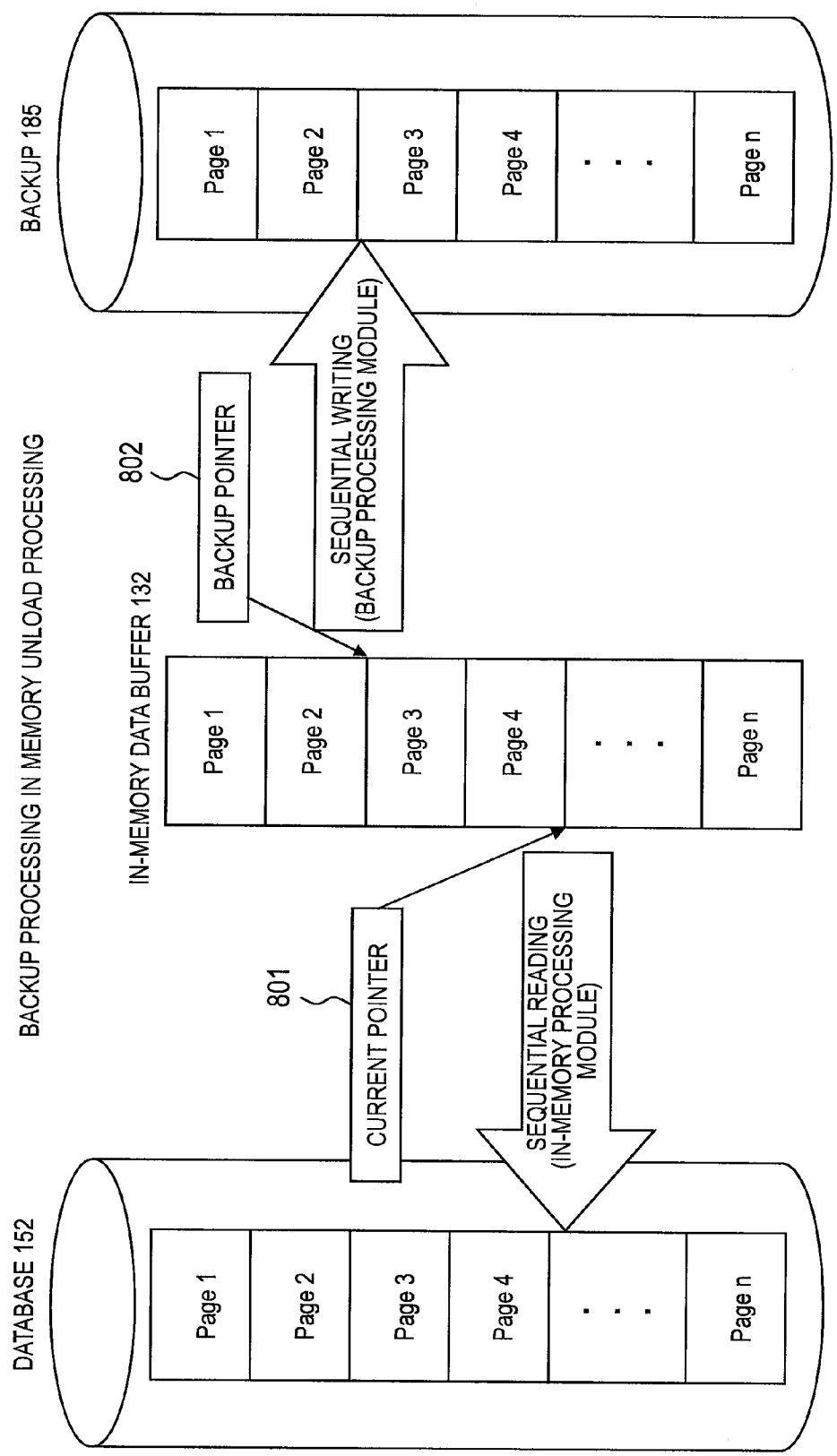
FIG. 9 is a diagram illustrating an overview of backup processing in memory unload processing according to the embodiment of this invention.

FIG. 9 is a diagram illustrating an overview of the backup processing in the memory unload processing according to the embodiment of this invention.

The memory unload processing is processing of synchronizing the data stored in the in-memory data buffer 132 on the database 152 after the batch job ends. In a case where the update processing is included in the batch job, this processing is performed if the database maintenance processing is performed based on the data after update.

In the processing illustrated in FIG. 9, after synchronizing the data stored in the in-memory data buffer 132 on the database 152, the processor 110 of the database management apparatus 100 writes the data in the backup 185 page by page.

The processor 110 of the database management apparatus 100 sequentially writes the data stored in the in-memory data buffer 132 in the database 152 in order from a start address by executing the in-memory processing module 124. The current pointer 801 is an address of a page whose data has been written in the database 152.

As in the backup processing in the memory load processing, the processor 110 of the database management apparatus 100 sequentially writes the data loaded to the in-memory data buffer 132 in the backup 185 page by page by executing the DB backup processing module 126 of the DB maintenance processing module 125. The backup pointer 802 is an address of a page whose data is written in the backup 185 from the in-memory data buffer 132.

Figure 10:
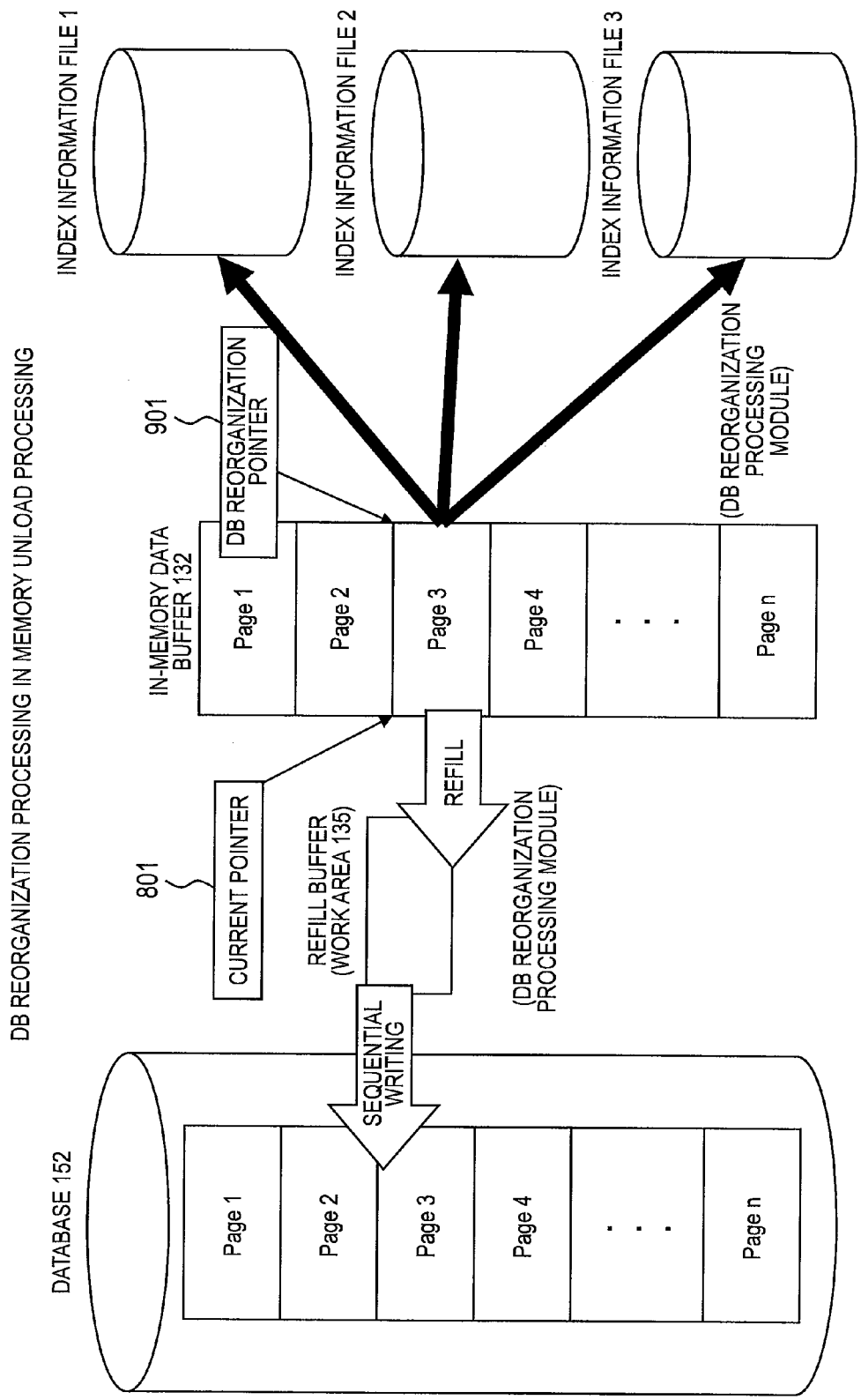
FIG. 10 is a diagram illustrating an overview of database reorganization processing in the memory unload processing according to the embodiment of this invention.

FIG. 10 is a diagram illustrating an overview of database reorganization processing in the memory unload processing according to the embodiment of this invention.

In the database reorganization processing, data stored in a fragmented state is reorganized to eliminate the fragmentation. Fragmentation of an index is also eliminated.

In the database reorganization processing according to the embodiment of this invention, after the batch job ends, the processor 110 of the database management apparatus 100 once stores the data stored in the in-memory data buffer 132 in a refill buffer record by record and then writes the data in the database 152 page by page. The refill buffer is created in the work area 135 of the memory 120 and deleted when the database reorganization processing ends.

The processor 110 of the database management apparatus 100 reorganizes the data stored in the in-memory data buffer 132 by executing the DB reorganization processing module 127 of the DB maintenance processing module 125 and writes the data in the database 152 page by page. The current pointer 801 is an address of a page whose a record is written in the refill buffer.

The processor 110 of the database management apparatus 100 performs the DB reorganization processing module 127 and also performs reorganization of an index of the reorganized data. The reorganized index is written in an index information file. The index information file is created in the work area 135. A DB reorganization pointer 901 is an address of a page whose index information is written in the index information file.

The current pointer 801 and the DB reorganization pointer 901 indicate addresses in the in-memory data buffer 132. The reorganization of the index is performed after the reorganization of the data. Therefore, the current pointer 801 is controlled to be always ahead of the DB reorganization pointer 901.

In a case where the reorganization for the database 152 ends, the processor 110 of the database management apparatus 100 performs reorganization of the index based on the index information file. In a case where the reorganization of the index ends, the processor 110 of the database management apparatus 100 deletes the index information file created in the work area 135 and finishes the database reorganization processing.

Details of the memory load processing and the memory unload processing will be described.

Figure 11:
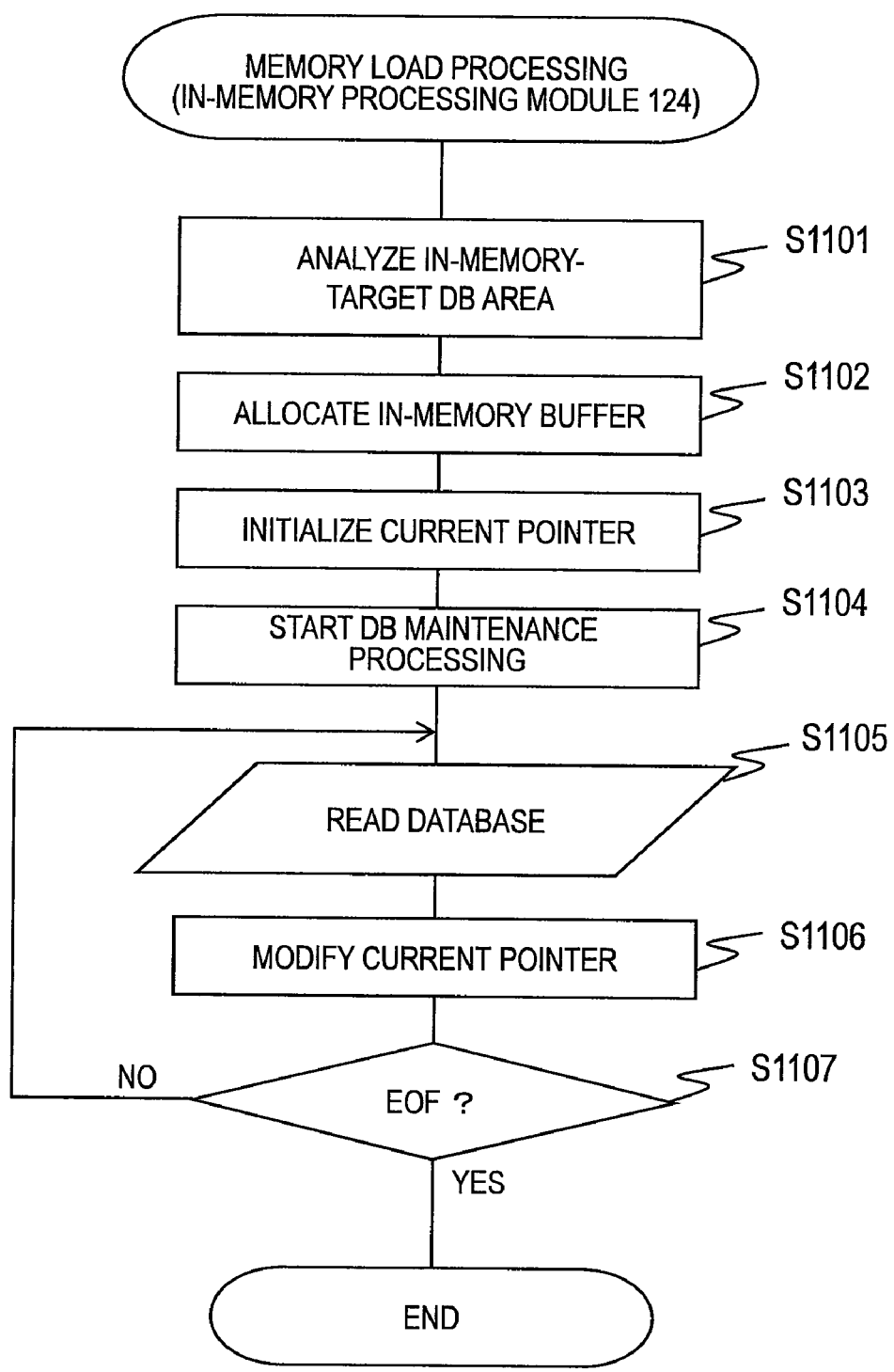
FIG. 11 is a flowchart illustrating a procedure of the memory load processing according to the embodiment of this invention.

FIG. 11 is a flowchart illustrating a procedure of the memory load processing according to the embodiment of this invention.

The processor 110 of the database management apparatus 100 receives a request for in-memory data processing. First, based on the received request, the processor 110 of the database management apparatus 100 analyzes, using the in-memory request analyzing module 123, a database area to be stored in-memory (S1101). The in-memory data processing is requested, for example, before the start of the batch job. The analysis of the database area includes determination of appropriateness of the database area to be stored in-memory, acquisition of a designated size of the database area, and the like.

Subsequently, the processor 110 of the database management apparatus 100 allocates the in-memory data buffer 132 to the memory 120 based on a result of the analysis processing in S1101 by executing the in-memory processing module 124 (S1102). Further, the processor 110 of the database management apparatus 100 initializes a current pointer by setting the current pointer in the start address of the allocated in-memory data buffer 132 (S1103).

Thereafter, the processor 110 of the database management apparatus 100 performs the DB maintenance processing module 125 and starts the database maintenance processing (S1104). As described above, the DB maintenance processing module 125 includes the DB backup processing module 126.

Details of the DB maintenance processing module 125 will be described later with reference to FIGS. 13 to 15.

The processor 110 of the database management apparatus 100 reads, using the in-memory processing module 124, the data from the database 152 and stores the data in the in-memory data buffer 132 page by page (S1105). When the data is stored in the in-memory data buffer 132, the current pointer is updated to an address of the stored data (S1106).

The processor 110 of the database management apparatus 100 determines whether the data has been read to the end (S1107). In a case where the readout of the data is completed ("Yes" in S1107), the processor 110 of the database management apparatus 100 completes the memory load processing. In a case where the readout of the data is not completed ("No" in S1107), the processor 110 of the database management apparatus 100 continues the readout of the data (S1105).

Figure 12:
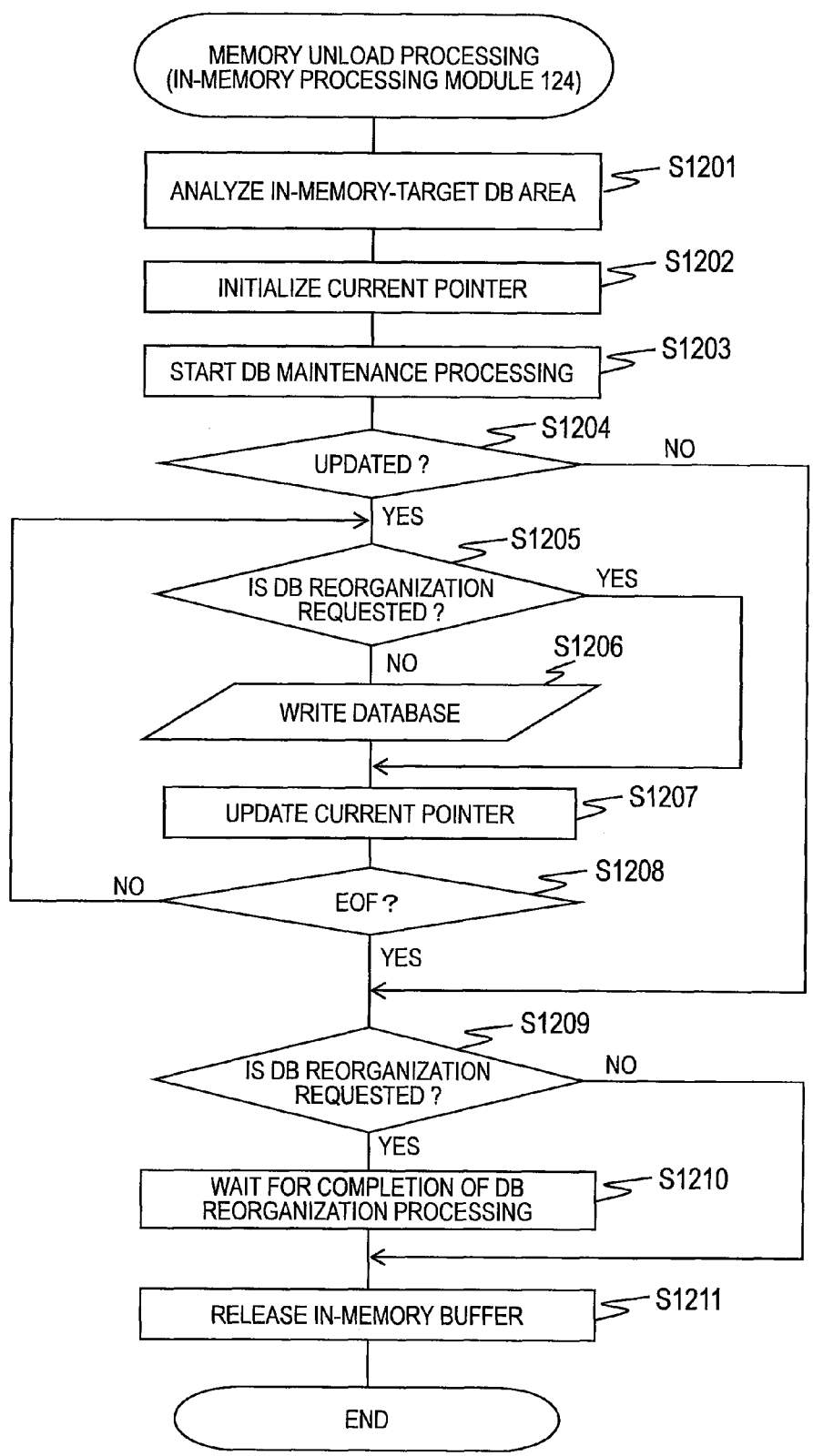
FIG. 12 is a flowchart illustrating a procedure of the memory unload processing according to the embodiment of this invention.

FIG. 12 is a flowchart illustrating a procedure of the memory unload processing according to the embodiment of this invention.

The processor 110 of the database management apparatus 100 writes the data stored in the in-memory data buffer 132 in the database 152. First, the processor 110 of the database management apparatus 100 analyzes, using the in-memory processing module 124, database area stored in-memory (S1201). Further, the processor 110 of the database management apparatus 100 initializes the current pointer by setting the current pointer in the start address of the allocated in-memory data buffer 132 (S1202).

Thereafter, the processor 110 of the database management apparatus 100 performs the DB maintenance processing module 125 and starts the database maintenance processing (S1203).

The processor 110 of the database management apparatus 100 performs the in-memory processing module 124 and determines whether the data stored in the in-memory data buffer 132 is updated by the in-memory data processing (S1204). It is possible to determine presence or absence of the update of the data stored in the in-memory data buffer 132 by referring to the update presence or absence flag 204 of the in-memory management table 131.

In a case where the data stored in the in-memory data buffer 132 is updated ("Yes" in S1204), it is necessary to synchronize update contents on the database 152, and hence the processor 110 of the database management apparatus 100 needs to write the data in the database 152. First, the processor 110 of the database management apparatus 100 determines whether DB reorganization is requested (S1205).

In a case where the DB reorganization is not requested ("No" in S1205), the processor 110 of the database management apparatus 100 writes the updated data in the database 152 (S1206).

In a case where the DB reorganization is requested ("Yes" in S1205) or in a case where the writing of the updated data in the database 152 ends, the processor 110 of the database management apparatus 100 updates the current pointer to an address of the written data (S1207). In a case where the DB reorganization is performed, the data is written in the database 152 by DB reorganization processing performed in parallel to the processing in S1203, and hence the processing in S1206 is not performed. The DB reorganization processing will be described later with reference to FIG. 14. The processor 110 of the database management apparatus 100 may acquire backup in the processing in S1203 in preparation for failure in the DB reorganization processing.

The processor 110 of the database management apparatus 100 determines whether the current pointer has reached a terminal end of the DB area (S1208). In a case where the current pointer has not reached the terminal end of the DB area ("No" in S1208), the processor 110 of the database management apparatus 100 continuously applies the processing from S1205 to S1207 to the unprocessed data stored in the in-memory data buffer 132.

In a case where the current pointer has reached the terminal end of the DB area ("Yes" in S1208), the processor 110 of the database management apparatus 100 determines again whether the DB reorganization is requested (S1209). In a case where the DB reorganization is requested ("Yes" in S1209), the processor 110 of the database management apparatus 100 stays on standby until execution of the DB reorganization processing performed in parallel is completed (S1210).

In a case where the DB reorganization is not requested ("No" in S1209) or when the execution of the DB reorganization processing is completed, the processor 110 of the database management apparatus 100 releases the in-memory data buffer 132 allocated to the memory 120 and finishes the memory unload processing.

The data load processing and the data unload processing performed at the timing of the database maintenance processing are described above. Details of the database maintenance processing performed in the data load processing and the data unload processing will be described below with reference to FIGS. 13 to 15.

Figure 13:
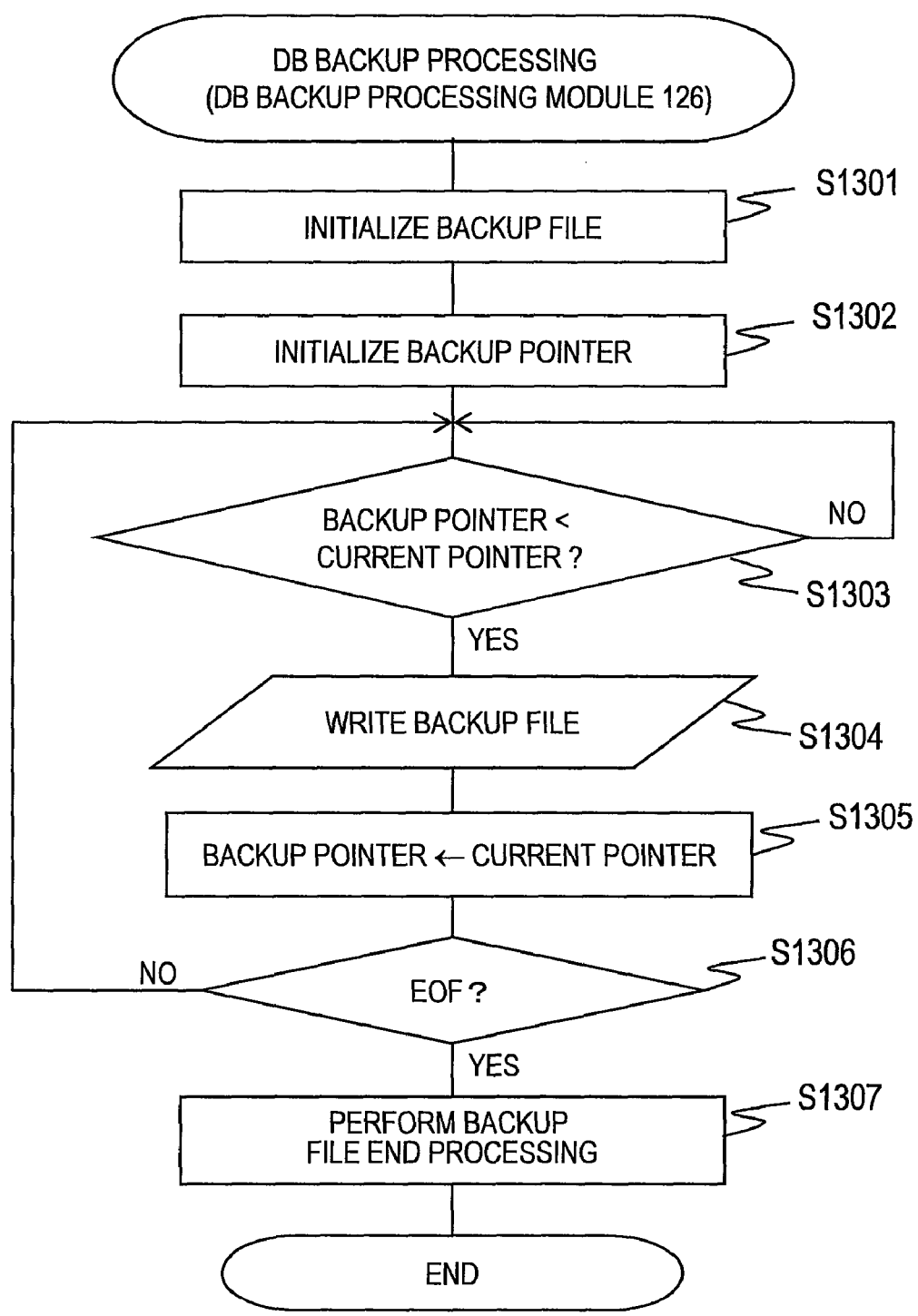
FIG. 13 is a flowchart illustrating a procedure of DB backup processing according to the embodiment of this invention.

FIG. 13 is a flowchart illustrating a procedure of DB backup processing according to the embodiment of this invention.

The DB backup processing is performed when the DB backup processing module 126 is processed by the processor 110 of the database management apparatus 100 as described above.

In a case where execution of the DB backup processing is requested by the data load processing or the data unload processing, first, the processor 110 of the database management apparatus 100 initializes a backup file for storing backup (S1301). The initialization of the backup file means, for example, generating of a new file for storing the backup in the storage apparatus 183 of the backup apparatus 180.

Subsequently, the processor 110 of the database management apparatus 100 initializes a backup pointer (S1302). The backup pointer is an address of a page, for which the storage of the backup is competed as described above. The initialization of the backup pointer means setting of the backup pointer in the start address of the in-memory data buffer 132.

The processor 110 of the database management apparatus 100 determines whether the current pointer is ahead of the backup pointer (S1303). As described above, the current pointer is an address of data stored in the in-memory data buffer 132 from the database 152 during data load or an address of data stored in the database 152 from the in-memory data buffer 132 during data unload.

In a case where the current pointer is not ahead of the backup pointer ("No" in S1303), i.e., in a case where the backup pointer catches up with the current pointer, loaded or unloaded data of the data is not present, and hence data that can be backed up is not present at present. Therefore, the processor 110 of the database management apparatus 100 stays on standby until data is loaded or unloaded.

On the other hand, in a case where the current pointer is ahead of the backup pointer ("Yes" in S1303), data that can be backed up is present, and hence the processor 110 of the database management apparatus 100 writes the data in the backup file initialized by the processing in S1301 (S1304). When the data that can be backed up is written in the backup file, the processor 110 of the database management apparatus 100 updates a value of the backup pointer to a value of the current pointer (S1305).

The processor 110 of the database management apparatus 100 determines whether all data pieces to be backed up are written in the backup file (S1306). In a case where all the data pieces to be backed up are not written in the backup file ("No" in S1306), the processor 110 of the database management apparatus 100 continues the backup processing.

On the other hand, in a case where all the data pieces to be backed up are written in the backup file ("Yes" in S1306), the processor 110 of the database management apparatus 100 performs backup file end processing (S1307). The backup file end processing is, for example, processing of closing the backup file.

Figure 14:
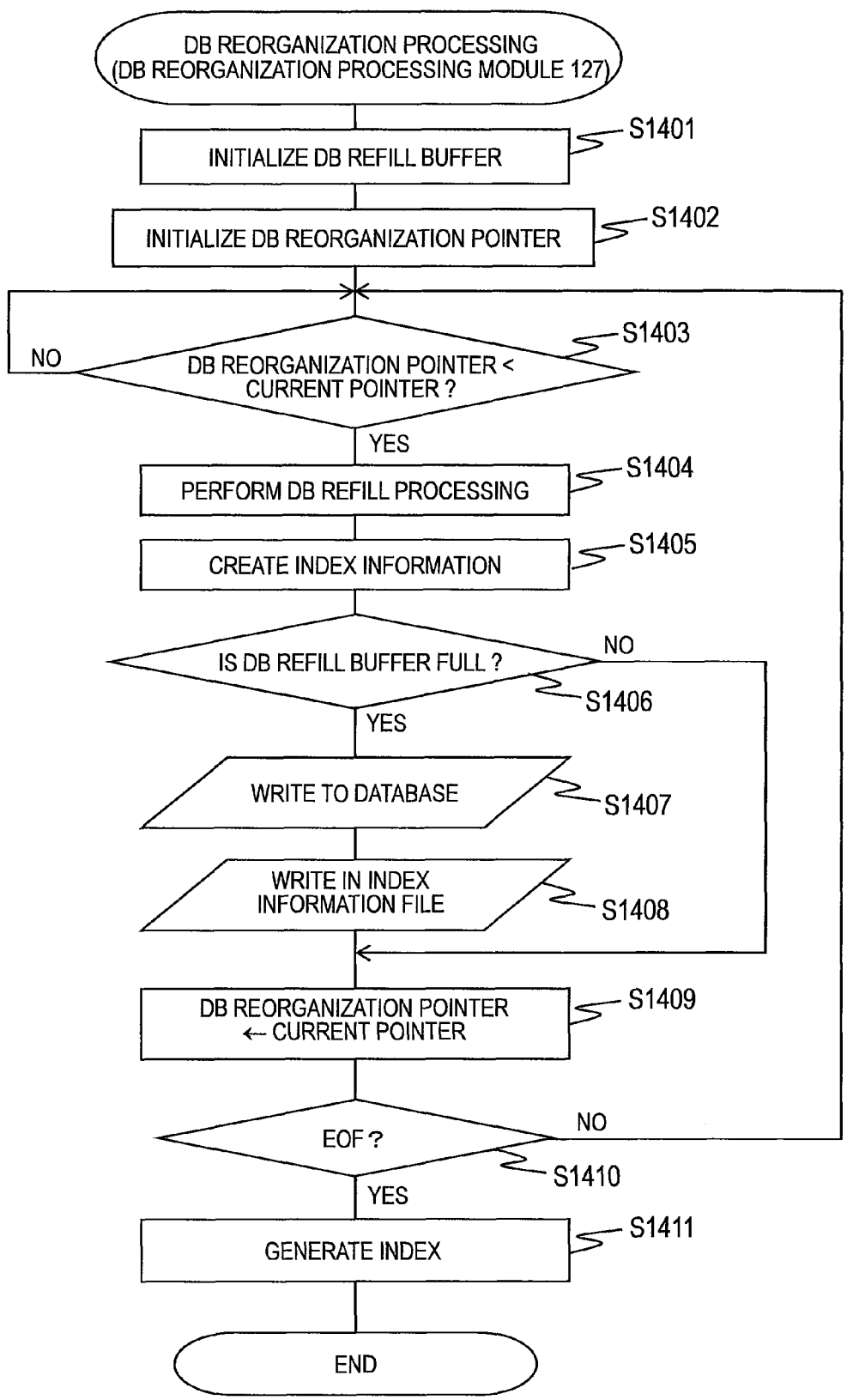
FIG. 14 is a flowchart illustrating a procedure of DB reorganization processing according to the embodiment of this invention.

FIG. 14 is a flowchart illustrating a procedure of DB reorganization processing according to the embodiment of this invention.

The DB reorganization processing is performed when the DB reorganization processing module 127 is processed by the processor 110 of the database management apparatus 100 as described above.

In the embodiment of this invention, records are read from the in-memory data buffer 132 and sequentially stored in the refill buffer, whereby the records are physically aligned. A database is reorganized by storing data stored in the refill buffer in the DB area in page units. The refill buffer is a storage area allocated to the memory 120 in order to temporarily store records read to align the records.

In a case of execution of the DB reorganization processing is requested by the data load processing or the data unload processing, first, the processor 110 of the database management apparatus 100 initializes the refill buffer for reorganizing records (S1401). The initialization of the refill buffer means allocating of the refill buffer to the work area 135. The size of the refill buffer only has to be equal to or larger than the size of one page.

Subsequently, the processor 110 of the database management apparatus 100 initializes a DB reorganization pointer (S1402). The DB reorganization pointer indicates an address of an area, in which the reorganization of the database is completed, on the in-memory data buffer 132. The initialization of the DB reorganization pointer means setting of the DB reorganization pointer in the start address of the in-memory data buffer 132.

The processor 110 of the database management apparatus 100 determines whether the current pointer is ahead of the DB reorganization pointer (S1403). In a case where the current pointer is not ahead of the DB reorganization pointer. ("No" in S1403), data to be written in the refill buffer is not present, and hence the processor 110 of the database management apparatus 100 stays on standby until the current pointer is updated.

In a case where the current pointer is ahead of the DB reorganization pointer ("Yes" in S1403), the processor 110 of the database management apparatus 100 performs DB refill processing (S1404). The DB refill processing means sequential storing of records in the DB refill buffer as described above.

Further, the processor 110 of the database management apparatus 100 creates index information corresponding to a record for which the DB refill processing is performed (S1405). The created index information is temporarily stored in the work area 135.

Subsequently, the processor 110 of the database management apparatus 100 determines whether the DB refill buffer is full (S1406). In a case where the DB refill buffer is not full ("No" in S1406), the processor 110 of the database management apparatus 100 updates a value of the DB reorganization pointer to a value of the current pointer (S1409) and continues the DB reorganization processing.

On the other hand, in a case where the DB refill buffer is full ("Yes" in S1406), the processor 110 of the database management apparatus 100 writes data stored in the DB refill buffer in the database 152 page by page (S1407). Further, the processor 110 of the database management apparatus 100 writes the index information created by the processing in S1405 in the index information file (S1408). The processor 110 of the database management apparatus 100 updates a value of the DB reorganization pointer to a value of the current pointer (S1409) and continues the DB reorganization processing.

The processor 110 of the database management apparatus 100 determines whether reorganization of all the data pieces stored in the in-memory data buffer 132 is finished (S1410). In a case where the reorganization of all the data pieces is not finished ("No" in S1410), the processor 110 of the database management apparatus 100 continues the DB reorganization processing.

On the other hand, in a case where the reorganization of all the data pieces is finished ("Yes" in S1410), the processor 110 of the database management apparatus 100 creates an index based on the index information stored in the index information file (S1411). Thereafter, the processor 110 of the database management apparatus 100 finishes the DB reorganization processing.

Figure 15:
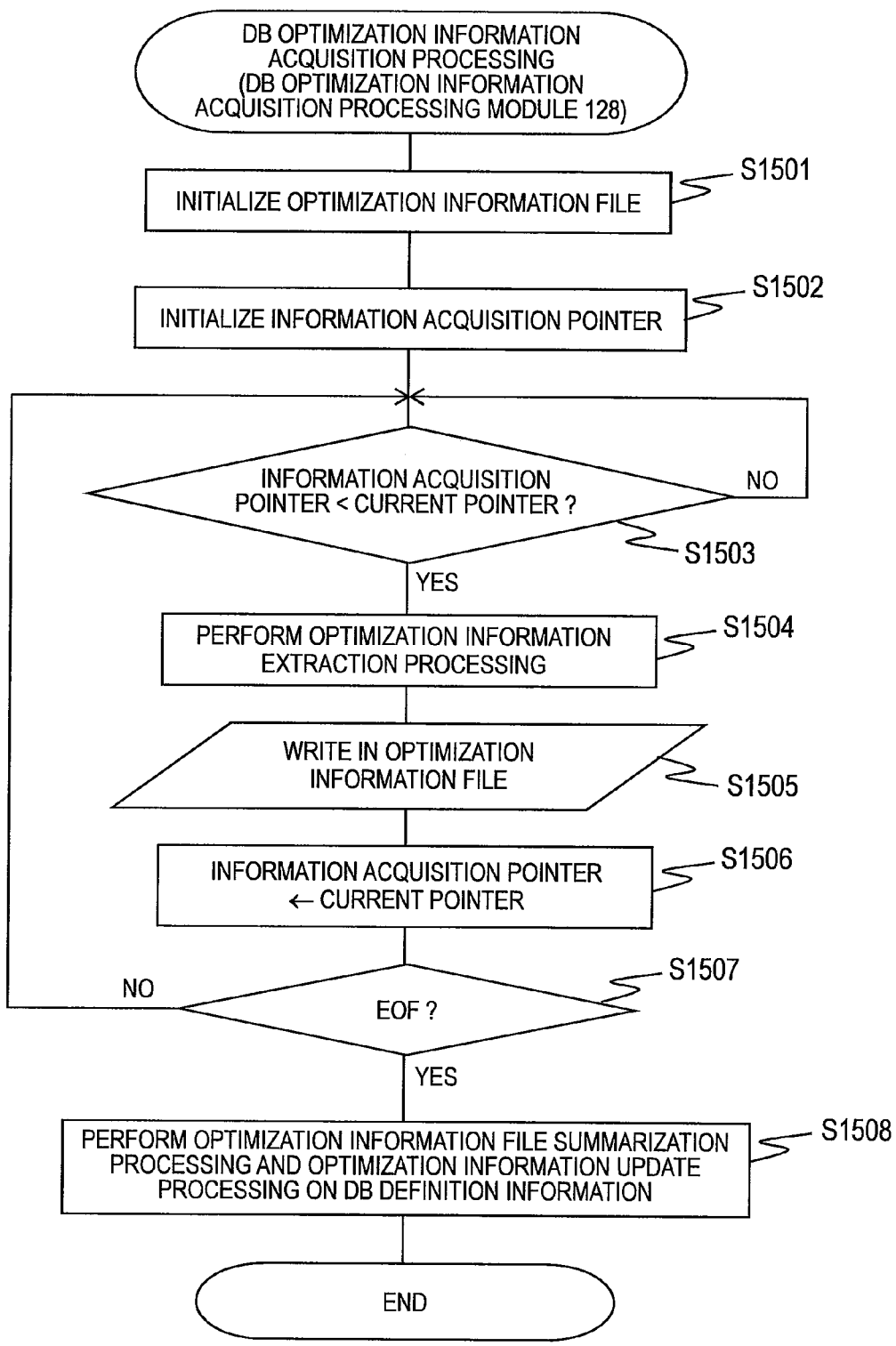
FIG. 15 is a flowchart illustrating a procedure of DB optimization information acquisition processing according to the embodiment of this invention.

FIG. 15 is a flowchart illustrating a procedure of DB optimization information acquisition processing according to the embodiment of this invention.

Most databases have a function of optimizing search processing based on statistics information such as the size of a table and a distribution of key values of indexes. The DB optimization information acquisition processing is processing of acquiring this statistics information (optimization information). The optimization information changes according to update and the like of data as described above, and hence it is necessary to periodically acquire the optimization information. The optimization information is stored in the DB definition information 151.

The DB optimization information acquisition processing is performed in a case where the DB optimization information acquisition processing module 128 is processed by the processor 110 of the database management apparatus 100 as described above.

In a case where execution of the DB optimization information acquisition processing is requested, first, the processor 110 of the database management apparatus 100 initializes an optimization information file for temporarily storing optimization information (S1501). The optimization information file is temporarily created in the work area 135 and, when summarization of the optimization information is completed, the optimization information is stored in the DB definition information 151. The initialization of the optimization information file means, for example, allocating of an area to the work area 135 and creating of a file anew.

Subsequently, the processor 110 of the database management apparatus 100 initializes an information acquisition pointer (S1502). The information acquisition pointer is an address of data for which the creation of the optimization information is completed. The initialization of the information acquisition pointer means setting of the information acquisition pointer in the start address of the in-memory data buffer 132.

Subsequently, the processor 110 of the database management apparatus 100 determines whether the current pointer is ahead of the information acquisition pointer (S1503). In a case where the current pointer is not ahead of the information acquisition pointer ("No" in S1503), data for which the optimization information is created is not present, and hence the processor 110 of the database management apparatus 100 stays on standby until the current pointer is updated.

In a case where the current pointer is ahead of the information acquisition pointer ("Yes" in S1503), the processor 110 of the database management apparatus 100 performs optimization information extraction processing (S1504). The optimization information extraction processing is processing of extracting information such as an amount of data and a distribution of the data and indexes based on read data. Further, the processor 110 of the database management apparatus 100 writes the extracted optimization information in the optimization information file (S1505) and updates a value of the information acquisition pointer to a value of the current pointer (S1506).

The processor 110 of the database management apparatus 100 determines whether the optimization information is extracted for all the data pieces stored in the in-memory data buffer 132 and written in the optimization information file (S1507). In a case where the extraction of the optimization information is not completed for all the data pieces ("No" in S1507), the processor 110 of the database management apparatus 100 continues the optimization information acquisition processing.

On the other hand, In a case where the extraction of the optimization information is completed for all the data pieces and the optimization information is written in the optimization information file ("Yes" in S1507), the processor 110 of the database management apparatus 100 performs optimization information file summarization processing (S1508). The optimization information file summarization processing is processing of summarizing statistics information by processing an amount of data, a distribution of the data, and the like extracted for each of the data. In a case where the optimization information file summarization processing is completed, the processor 110 of the database management apparatus 100 performs optimization information update processing of reflecting a result of the summarization on the DB definition information 151 (S1508). Finally, the processor 110 of the database management apparatus 100 deletes the optimization information file, releases an area in the work area 135, and finishes the DB optimization information acquisition processing.

Lastly, a data access procedure in the in-memory data processing will be described.

Figure 16:
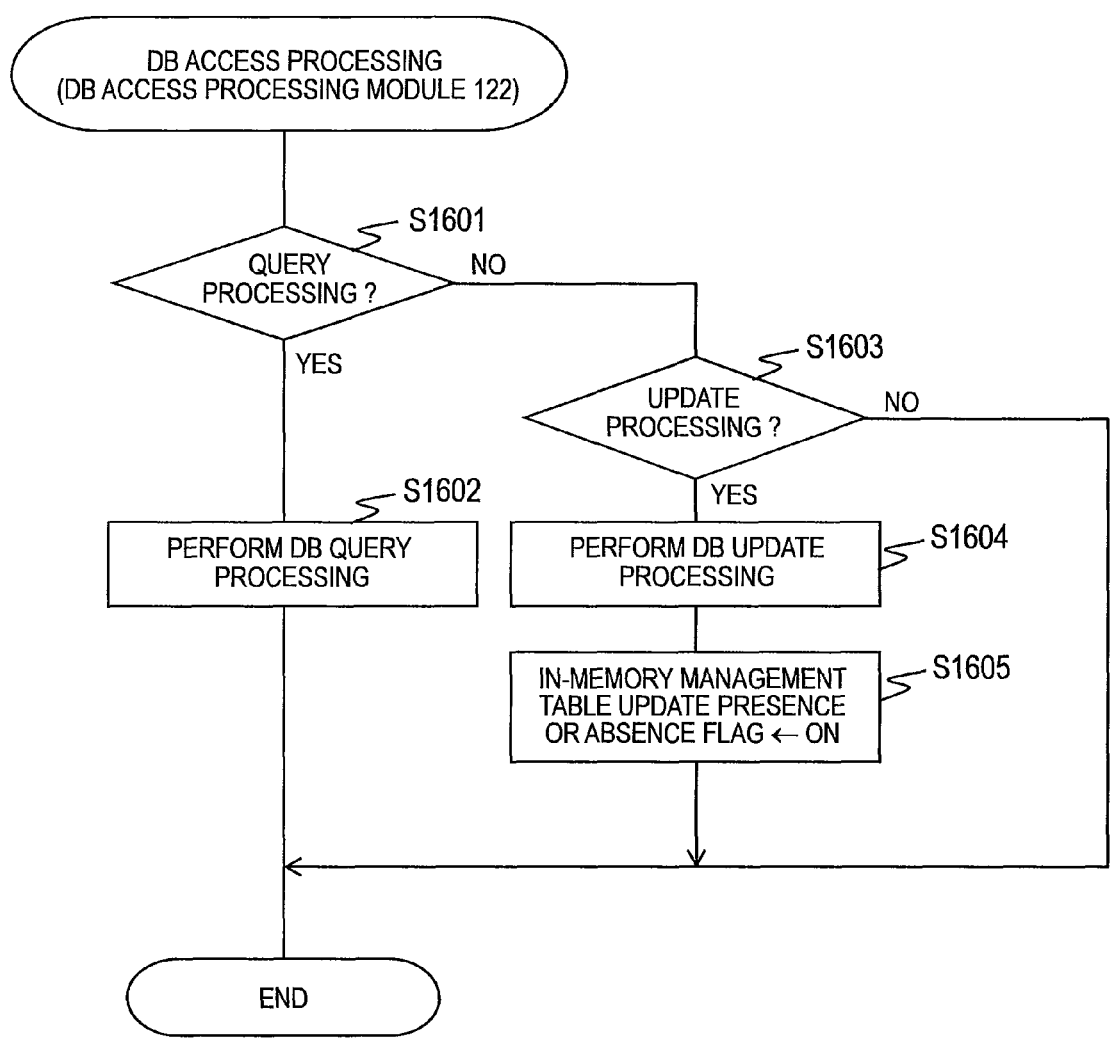
FIG. 16 is a flowchart illustrating a procedure of DB access processing in in-memory data processing according to the embodiment of this invention.

FIG. 16 is a flowchart illustrating a procedure of DB access processing in the in-memory data processing according to the embodiment of this invention.

In the embodiment of this invention, after the online job is stopped, the in-memory data processing is performed in the batch job. The processing illustrated in FIG. 16 is processing of executing the DB access processing requested in the batch job.

The processor 110 of the database management apparatus 100 receives a DB access request. The processor 110 of the database management apparatus 100 analyzes contents of the request using the DB access request analyzing module 121. The processor 110 of the database management apparatus 100 performs the DB access processing module 122 and determines whether requested processing is query processing based on a result of the analysis (S1601).

In a case where the requested processing is the query processing ("Yes" in S1601), the processor 110 of the database management apparatus 100 performs DB query processing (S1602) and finishes the DB access processing.

In a case where the requested processing is not the query processing ("No" in S1601), the processor 110 of the database management apparatus 100 determines whether the requested processing is update processing (S1603). In a case where the requested processing is not the update processing ("No" in S1603), the processor 110 of the database management apparatus 100 finishes the DB access processing.

In a case where the requested processing is the update processing ("Yes" in S1603), the processor 110 of the database management apparatus 100 performs DB update processing (S1604). The processor 110 of the database management apparatus 100 sets an update presence or absence flag of the in-memory management table 131 corresponding to an updated database area to "ON" (S1605). According to the processing in S1605, it is possible to determine in the memory unload processing whether the data stored in the in-memory data buffer 132 is stored.

In the embodiment of this invention, in a case where the batch job in which a large amount of data input and output to and from the external storage medium occur is performed, the in-memory data processing of storing all processing target data pieces in the memory is performed. According to the embodiment of this invention, in a case where the batch job is performed, it is possible to reduce a period of time for reading data from the external storage medium by executing the maintenance job such as backup using the data stored in the memory. Therefore, total required time for the batch job and the maintenance job is reduced. It is possible to reduce a period of time until the online job is resumed.

While the present invention has been described in detail and pictorially in the accompanying drawings, the present invention is not limited to such detail but covers various obvious modifications and equivalent arrangements, which fall within the purview of the appended claims.

What is claimed is:

1. A database management method in a database management apparatus that manages a database stored in a storage apparatus, the database management apparatus comprising:
   an interface coupled to the storage apparatus;
   a processor coupled to the interface; and
   a memory coupled to the processor;
   the database management method including the steps of:
   executing, by the database management apparatus, load processing of storing data which is stored in the database in the storage apparatus to the memory;
   executing, by the database management apparatus, a batch job by reading and writing the data which is stored in the memory without accessing the storage apparatus;
   executing, by the database management apparatus, unload processing of writing the data which is stored in the memory to the storage apparatus after the completion of the batch job; and
   executing, by the database management apparatus, a maintenance processing for the database using the data which is stored in the memory at for a time of executing at least one of the load processing and the unload processing, wherein:
   when the maintenance processing is a first backup processing to a backup apparatus coupled to the database management apparatus at the time of executing the load processing, the database management apparatus executes the first backup processing in parallel to the load processing using a current pointer which is a pointer for writing data from the storage apparatus to the memory and a backup pointer which is a pointer for reading data from the memory to the backup apparatus while controlling the current pointer to precede the backup pointer; and when the maintenance processing is a second backup processing to the backup apparatus coupled to the database management apparatus at the time of executing the unload processing, the database management apparatus executes the backup processing in parallel to the unload processing using a current pointer which is a pointer for writing data from the storage apparatus to the memory and a backup pointer which is a pointer for reading data from the memory to the backup apparatus while controlling the current pointer to precede the backup pointer.

2. The database management method according to claim 1, wherein when the maintenance processing is database reorganization processing of executing the database at the time of the unload processing, the database management apparatus executes the database reorganization processing of storing data read from the memory using the current pointer to a refill buffer in the database management apparatus record by record and writing the data to the database in the storage apparatus page-by-page to eliminate a fragmented state of the data.

3. An apparatus comprising:
a database management unit comprising:
an interface;
a processor; and
a memory, wherein the interface and processor are coupled to the memory and to each other;
a storage unit comprising a database coupled to the interface; and
a backup unit comprising a backup storage coupled to the interface, wherein the processor is configured to:
executing load processing of storing data which is stored in the database to the memory;
executing a batch job by reading and writing the data which is stored in the memory without accessing the storage unit;
executing unload processing of writing the data which is stored in the memory to the storage \ unit after the completion of the batch job; and
executing maintenance processing for the database using the data which is stored in the memory at a time of executing at least one of the load processing and the unload processing, wherein the processor is configured:
when the maintenance processing is a first backup processing to the backup unit at the time of executing the load processing, to execute the first backup processing in parallel to the load processing using a current pointer which is a pointer for writing data from the storage unit to the memory and a backup pointer which is a pointer for reading data from the memory to the backup unit while controlling the current pointer to precede the backup pointer; and
in a case where the maintenance processing is a second backup processing to the backup unit coupled to the processor at the time of executing the unload processing, to execute the second backup processing in parallel to the unload processing using a current pointer which is a pointer for writing data from the storage unit to the memory and a backup pointer which is a pointer for reading data from the memory to the backup unit while controlling the current pointer to precede the backup pointer.

4. The apparatus according to claim 3, wherein the processor is configured, when the maintenance processing is database reorganization processing of the database at the time of executing the unload processing, to execute the database reorganization processing of storing data read from the memory using the current pointer to a refill buffer in the memory by recording and writing the data to the database in the storage unit page by page to eliminate a fragmented state of the data.

5. A non-transitory storage medium recorded by a database management unit that manages a database stored in a storage unit implementing a database management program, the database management program instructing the database management unit to perform the steps of:
executing, by the database management unit, load processing of storing data which is stored in the database in the storage unit to the memory;
executing, by the database management unit, a batch job by reading and writing the data which is stored in the memory without accessing the storage unit;
executing, by the database management unit, unload processing of writing the data which is stored in the memory to the storage unit after the completion of the batch job; and
executing, by the database management unit, maintenance processing for the database using the data which is stored in the memory at a time of executing at least one of the load processing and the unload processing, wherein:
when the maintenance processing is a first backup processing to a backup unit coupled to the database management unit at the time of executing the load processing, the database management unit executes the first backup processing in parallel to the load processing using a current pointer which is a pointer for writing data from the storage unit to the memory and a backup pointer which is a pointer for reading data from the memory to the backup unit while controlling the current pointer to precede the backup pointer; and
when the maintenance processing is a second backup processing to the backup unit coupled to the database management unit at the time of executing the unload processing, the database management unit executes the second backup processing in parallel to the unload processing using a current pointer which is a pointer for writing data from the storage unit to the memory and a backup pointer which is a pointer for reading data from the memory to the backup unit while controlling the current pointer to precede the backup pointer.

6. The storage medium according to claim 5, wherein when the maintenance processing is database reorganization processing of the database at the time of executing the unload processing, the database management unit executes the database reorganization processing of storing data read from the memory using the current pointer to a refill buffer in the database management unit record by recording and writing the data to the database in the storage unit page by page to eliminate a fragmented state of the data.

* * * * *